(12) United States Patent
Slaghek et al.

(10) Patent No.: US 7,531,245 B2
(45) Date of Patent: May 12, 2009

(54) METHOD FOR MANUFACTURING INSULATING AND/OR FIRE-RESISTANT MATERIAL, AND SUCH INSULATING AND/OR FIRE-RESISTANT MATERIAL AND A CONSTRUCTION ELEMENT PROVIDED WITH SUCH INSULATING AND/OR FIRE-RESISTANT MATERIAL

(75) Inventors: Theodoor Maximiliaan Slaghek, Rotterdam (NL); Willem Cornelis Drost, Zeist (NL); Peter Johannes Fraanje, Middelburg (NL); Jan Matthijs Jetten, Zeist (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 10/558,798

(22) PCT Filed: Jun. 3, 2004

(86) PCT No.: PCT/NL2004/000395

§ 371 (c)(1),
(2), (4) Date: Aug. 8, 2006

(87) PCT Pub. No.: WO2004/108768

PCT Pub. Date: Dec. 16, 2004

(65) Prior Publication Data

US 2007/0039613 A1 Feb. 22, 2007

(30) Foreign Application Priority Data

Jun. 5, 2003 (NL) .................................. 1023610

(51) Int. Cl.
*B32B 9/02* (2006.01)
*C08K 11/00* (2006.01)
*C09D 197/00* (2006.01)
*C08L 97/00* (2006.01)

(52) U.S. Cl. .................. 428/532; 428/455; 428/456; 106/125.1; 106/126.1; 106/134.1; 106/615; 524/15

(58) Field of Classification Search ............... 106/615, 106/126.1, 125.1, 134.1; 524/15; 428/455, 428/456, 532
See application file for complete search history.

(56) References Cited

U.S. PATENT DOCUMENTS

| 1,659,539 | A | * | 2/1928 | Judson | .................. 52/787.1 |
| 3,753,938 | A | * | 8/1973 | Edwards | ................... 428/138 |
| 4,320,156 | A | * | 3/1982 | Oakes et al. | ............... 427/213 |
| 6,547,867 | B2 | * | 4/2003 | Rogols et al. | ............ 106/134.1 |

FOREIGN PATENT DOCUMENTS

| GB | 515143 | * | 2/1938 |
| NL | DE 198 17 541 A 1 | | 4/1998 |
| NL | DE 199 38 155 A 1 | | 8/1999 |
| WO | WO 00/58085 | | 10/2000 |

OTHER PUBLICATIONS

Camire, et al. "Enzymatic Starch Hydrolysis of Extruded Potato Peels," *VCH Verlagsgeselischaft mbH* (1994,) 46:308-311.
Mayer, Hans. "A Method of Producing Cork-products from Indigenous Raw Materials," Leamington Spa (1939,) 5770(38), No. 515,143.

* cited by examiner

*Primary Examiner*—David M Brunsman
(74) *Attorney, Agent, or Firm*—Hoffmann & Baron, LLP

(57) ABSTRACT

A method for manufacturing insulating and/or fire-resistant material, wherein the potato steam peels are subjected to a treatment for recovering a cork fraction, at least a non-calorific part, from those peels, while the insulating and/or fire resistant material is manufactured at least from the recovered cork fraction and a binding agent. The invention further provides insulating and/or fire-resistant material containing at least a cork fraction recovered from potato steam peels. Further, the invention provides a construction element, provided with such insulating and/or fire-resistant material.

26 Claims, No Drawings

METHOD FOR MANUFACTURING INSULATING AND/OR FIRE-RESISTANT MATERIAL, AND SUCH INSULATING AND/OR FIRE-RESISTANT MATERIAL AND A CONSTRUCTION ELEMENT PROVIDED WITH SUCH INSULATING AND/OR FIRE-RESISTANT MATERIAL

This application is the U.S. National Phase of International Application Number PCT/NL2004/000395 filed on 3 Jun. 2004, which is incorporated herein by reference.

BACKGROUND OF THE INVENTION

The invention relates to a method for manufacturing insulating and/or fire-resistant material.

From the state of the art it is known to manufacture insulating material from cork, see, for instance, British patent GB 491,428 (Vereinigte Korkindustrie AG). In this document, a method is described for manufacturing insulating material by compressing cork granules. The granules are provided with a binding agent for binding the granules to each other after pressing. A drawback of this method is that after pressing, the cork granules are bound to each other relatively weakly, rendering the thus obtained material relatively fragile.

The object of the present invention is a method for manufacturing relatively firm, insulating and/or fire-resistant material, preferably having good insulating and/or fire-resistant properties.

DESCRIPTION OF THE INVENTION

To this end, the method according to the invention is characterized in that potato steam peels are subjected to a treatment for recovering a cork fraction, at least a non-calorific part, from those peels, while the insulating and/or fire-resistant material is manufactured at least from the recovered cork fraction and a binding agent.

Surprisingly, in this manner, relatively firm insulating and/or fire-resistant material can be manufactured. The cork fraction of the potato steam peels substantially comprises non-calorific parts of such peels. The cork fraction is obtained by removing calorific parts such as starch, cellulose, hemicellulose and pectin at least partially from the potato steam peels and/or by chemically modifying such calorific parts. The thus obtained material appears to exhibit a surprisingly good fire resistance, rendering the material eminently suitable to be used as, for instance, fire retardant.

The cork fraction of the potato steam peels comprises relatively thin and firm sheets which can be bound to each other or to a different material in a relatively strong manner by the binding agent mentioned, this in contrast to the compressed cork granules known from the state of the art. The other material mentioned can be, for instance, already manufactured material, for instance of a construction element, to which the cork fraction is then applied.

The binding agent serves in particular for keeping the cork fraction together and/or binding it to other material of the insulating and/or fire-resistant material to be manufactured. To this end, various sorts of binding agents can be used, for instance an acetylated carbohydrate, modified protein, inorganic binding agent, poly acetate, a glue, for instance urea formaldehyde glue (UF), water glass and/or a different binding agent. The binding agent can be obtained, for instance, by modifying the carbohydrate fraction in the potato steam peel. Such modification can be carried out via, for instance, oxidation, cross-linking and/or hydrophobing these carbohydrate fractions. It has appeared that the gelatinized starch already present can also serve as binding agent. The binding agent can be curable in different manners, for instance under the influence of drying, a temperature treatment and/or a light treatment. Preferably, the binding agent comprises a fire-resistant material in itself, for instance water glass or the like.

An additional advantage of the method according to the invention is that a highly practical use has been found for the cork fraction of the potato steam peels. Heretofore, these peels were used only as cattle feed. In practice, the potato processing industry appears to produce such a large amount of potato peels that large amounts thereof still disappear as waste into the environment. By processing the cork fraction of the peels into insulating and/or fire-resistant material, the amount of waste formed by the peels can be considerably reduced.

The cork fraction can be recovered from the potato steam peels in various manners. Such separation can be carried out in different manners. A relatively simple manner is by pressing the peels, such that a starch containing part is separated from a non-calorific part. The pressing can, for instance, be carried out such that after pressing, the peels contain less than approximately 400 g of starch per 1000 g of dry matter, preferably less than approximately 300 g of starch per 1000 g of dry matter and more particularly approximately 200 g of starch or less per 1000 g of dry matter.

A different method is, for instance, by fermenting the peel, at least the starch present therein. The products that are formed in such fermentation are alcohol and a cork fraction. The alcohol and the cork fraction can be separated from each other in different manners, for instance by means of filtration, drying and/or a temperature treatment.

In yet another method, the potato steam peels is brought under the influence of an enzyme, which enzyme hydrolyzes starch from the peel for obtaining a cork fraction from the peel. During recovery of the cork fraction from the potato steam peels, furthermore, various other treatments, in combination or not in combination with each other, can be carried out. Such treatments can serve in particular, for converting the calorific parts of the peels into binding agent. To this end, the potato steam peels can be treated by oxidizing the carbohydrate present in the peels at least partially. Furthermore, a method is possible in which the potato steam peels undergo an ozone treatment. Further, the potato steam peels can be acetylated. Some specific examples of such methods are further described in the following. Naturally, further, combinations of these methods and/or sub-steps of these methods can be used for recovering the cork fraction from the potato steam peels.

It is noted that the use of untreated potato peels for manufacturing insulating material is known from Offenlegungsschrift DE 198 17 541 (Behrendt et al.). However, this document describes a composite of natural material and a relatively large amount of plastic foam. The composite foam material described in this document is relatively weak with respect to the insulating and/or fire-resistant material obtained with the method according to the present invention, as the composite comprises the relatively weak plastic foam as well as calorific parts of natural material. Moreover, such calorific parts bind relatively badly to each other and to the foam material, thereby further weakening the composite material described in DE 198 17 541. Further, this composite material is not fire-resistant.

The invention further provides insulating and/or fire-resistant material containing at least a cork fraction recovered from potato steam peels.

As the material comprises cork fraction from the potato steam peel, the material can be designed to be relatively sound-insulating, heat-insulating, firm, fire-resistant and light weight. Moreover, the cork fraction mentioned is a natural product, which, from an environmental point of view, makes the use of this material in construction material advantageous. The fire resistance is obtained without, for instance, using large amounts of chemical fire retardants, such as phosphates, ammonium or silicates. If desired, the fire resistance can still be increased by adding such substances, for instance to the binding agent mentioned. Preferably, the cork fraction is bound to itself and/or other materials by a binding agent. Preferably, the insulating and/or fire-resistant material is manufactured substantially from the cork fraction mentioned, so that the material is relatively light.

The insulating and/or fire-resistant material provided by the invention can be used in an advantageous manner in construction elements. Such elements can comprise, for instance, plate material, walls, laminate, sandwich constructions, construction blocks, beams, doors, windows, window casings, ceiling parts, boards, floor parts, chipboard, roof boxes and/or the like. Such elements can be completely manufactured from the material provided by the invention. In addition, such elements can contain one or more different materials, for instance wood, metal, plastic or a combination of these or other materials. In the latter case, the material manufactured from the cork fraction can be processed into the element in different manners. The material can, for instance, be surrounded by other material and/or extend on a surface of the element. Preferably, the insulating and/or fire-resistant material covers a surface of the element completely, for instance for the purpose of providing on that surface a desired fire resistance of that construction element. The element can then be provided with, for instance, at least one layer of the insulating and/or fire-resistant material and at least one layer of the other material mentioned. The material can be used inside and/or outside the house.

Further elaborations are described in the subclaims. Presently the invention will be clarified with reference to a number of examples.

The following examples given some possible processes for recovering the cork fraction from the potato steam peels.

EXAMPLES

Example 1

To 500 g of potato steam peels (both washed and unwashed) are added 500 ml of water. The temperature of the mixture is brought to 65° C. When this temperature is reached, 5 ml of Termamyl are added (720 units of enzyme). Then, the reaction mixture is incubated for 5 hours while being stirred. Thereupon, the reaction mixture is filtered, after which the residue (the peels) is washed twice with water and once with ethanol. The remaining fraction is dried in the air at room temperature.

Example 2

Synthesis with Sodium Trimetaphosphate (STMP)

To 58 g of potato steam peels (both washed and unwashed) are added 17 g of potassium hydroxide and 11 g of STMP. Thereupon, the reaction mixture is maintained at 60° C. for 5 hours. After this, additional water is added (50 ml) and the reaction mixture is neutralized with 4 M HCl. Thereupon, the reaction mixture is filtered through a P2 glass filter and the residue is rinsed with water. Hereafter, the residue is suspended in ethanol, filtered and rinsed with ethanol and dried in the air at room temperature.

Example 3

Synthesis with Sodium Trimetaphosphate (STMP)

To 300 g of peels are added 100 ml of water, 8 g of NaOH and 5 g of STMP. Thereupon, the reaction mixture is maintained at 60° C. for 3 hours, whereupon the slurry is neutralised with 4 M HCl. After this, the peels are filtered through a glass filter and rinsed with 1.5 l of water and 1 liter of alcohol. The peels are dried in the air at room temperature on filtering paper.

Example 4

Synthesis with Monochloroacetic Acid

To 50 g of potato steam peels are added 15 g of sodium hydroxide and 10 g of monochloroacetic acid. The reaction mixture is well stirred for 4 hours at 65° C. Hereupon, water is added (50 ml) and neutralised with 4 M HCl. Then, the product is isolated via ethanol precipitation.

Example 5

Synthesis with Octenyl Succinic Acid

With this compound, two reactions have been carried out:
1) To 50 g of peels are added 60 ml of water. Then, the mixture is brought to pH 9 with 0.5 M KOH whereupon 50 ml of octenyl succinic acid anhydride are added in three portions (5 ml each). During adding, the pH is maintained constant with the aid of a pH-stat. The product is isolated by rinsing it with water (approximately 1 liter).
2) To 50 g of peels are added 75 ml of water pH 13 and 5 g of octenyl succinic acid anhydride. With the aid of a pH-stat, the pH is maintained constant at 9. After 30 minutes, again, 10 g of octenyl succinic acid are added. The solution appears to thicken during the reaction, but is thin again at the end of the reaction. This product is worked up as described at 1.

Example 6

Oxidation of Termamyl-Treated Peels in the Presence of TEMPO (tetramethyl piperidine 1 oxyl)

The oxidation of peels is carried out with TEMPO/NaOCl/Br. The carbohydrate present is oxidized, maximally as well as partially. An example of a partial oxidation is described hereinbelow:

To 10 g of peels treated with Termamyl, 250 ml of water are added and the pH is brought to 10. To the slurry are added 0.5 g of TEMPO, 0.2 g of NaBr dissolved in water and 25 ml of NA OCl (55 meq) in portions of 5 ml. The pH is maintained at 10 with 1 M NaOH under pH-stat conditions. For this reaction, in total, 45.3 mmol of NaOH is required for maintaining the pH constant. When no additional acid formation is observed, the reaction is stopped, the solution neutralized and filtered through a glass filter.

Example 7

Oxidation of Termamyl-Treated Peels with NaOCl

To 10 g of peels, 250 ml of water are added and the pH is brought to 10. To the slurry, 25 ml of NaOCL are added in portions of 5 ml. The reaction proceeds considerably slower than the reaction in which TEMPO and sodium bromide are present. In total, 22.8 mmol of NaOH are added. When no acid formation is observed any longer, the reaction is stopped and the slurry is neutralized and filtered.

Example 8

Oxidation of Potato Steam Peels 300 g of peels are stirred up with a top stirrer in 800 ml of water. Then are added 1.0 g of TEMPO and 0.25 g of NaBr and the pH is brought to 10 with NaOH. Then, 125 ml of NaOCl are added in portions of 5 ml. The pH is maintained at 10 with 1M NaOH via an automatic titration. In total, 170 ml of NaOH are added. Thereupon, to the peels, ethanol is added and filtered through a glass filter. The peels are rinsed with one liter of 100% ethanol and dried in the air at room temperature on filtering paper.

Example 9

Oxidation of the Peels after Termamyl Treatment 30 g of peels, treated with Termamyl, are stirred up with a top stirrer in 800 ml of water. To this are added 1 g of TEMPO and 0.25 g of NaBr. The pH is brought to 10 with NaOH 75 ml and NaOCl is added in portions of 5 ml. During the reaction, the pH is maintained at 10 with 1 M NaOH via an automatic titration. In total are added 71.4 ml of 1M NaOH. Thereupon, to the peels, 800 ml of ethanol is added and filtered. The peels are then rinsed with 1l liters of ethanol and dried in the air at room temperature on filtering paper.

Example 10

Acetylation of Peels (1)

To 50 g of peels are added 250 ml of water. The pH is brought to, and maintained at 9 under pH-stat conditions. 5.40 g of acetic acid anhydride is added in portions of 0.22 g. For the total reaction and pH adjustment, 107 mmol of NaOH are added. Afterwards, the mixture is neutralized and filtered through a glass filter.

Example 11

Acetylation of Peels (2)

200 g of peels are stirred up in 700 ml of water whereupon the pH is brought to 8. To the slurry, 50 ml of acetic acid anhydride are added in portions of 2.5 ml. The pH is maintained at 8 via an automatic titration with NaOH (1M and 33% NaOH solution). Hereupon, the slurry is neutralised with 4M HCl and filtered, rinsed with 500 ml of water and 1 liter of 100% alcohol. The peels are dried in the air at room temperature on filtering paper.

Example 12

Pressing 1000 g of potato steam peels are pressed at a particular pressure. Prior to the pressing, the peels contain approximately 500 g of starch. After pressing, the peels appear to contain only approximately 200 g of starch per 1000 grams of dry matter.

The cork fraction recovered from the potato steam peels, recovered for instance, via one of the examples 1-12 mentioned hereinabove or via combinations of the steps indicated in these examples, can be processed in different manners to form an insulating and/or fire-resistant material.

According to an advantageous elaboration of the invention, the recovered cork fraction and the binding agent are pressed for the purpose of manufacturing the insulating and/or fire-resistant material. Pressing can be carried out, for instance, at a pressure of at least 10 KN. According to a further elaboration, the cork fraction and the binding agent themselves can be compressed for forming insulating material and/or fire-resistant material. According to an alternative elaboration, the cork fraction and the binding agent can be compressed, together with different materials, for instance other materials such as wood, plastic, metal or a combination of such different materials. In this manner, for instance, sandwich structures can be manufactured which have the advantageous properties of the cork fraction mentioned. In addition, the insulating and/or fire-resistant material manufactured from the cork fraction can be attached to other materials in various manners, for instance by gluing, with the aid of attachment means, clamping means and the like.

Further, the insulating and/ or fire-resistant material can be applied to at least one surface of a different material and/or a construction element. In this manner, such a different material and/or construction element can simply be provided with a relatively light fire-resistant insulating layer.

According to a further elaboration of the invention, after pressing, the cork fraction is brought to a particular drying temperature for a particular drying period, for instance for the purpose of drying a particular binding agent used.

As described, various sorts of binding agents can be used for binding the cork fraction. To this end, the cork fraction can also, for instance, have to undergo a temperature treatment for binding the cork fraction, in particular for the purpose of drying, activating and/or curing the binding agent.

The following example describes a use of the recovered cork fraction.

Example 13

Approximately 500 g of the cork fraction recovered from the potato steam peels was mixed with approximately 400 g of water glass for the purpose of binding. The thus obtained mixture is pressed on an OSB plate at room temperature, at a pressure of approximately 30 tons, for forming a laminate. The OSB plate is a wood-like plate with a layered structure, comprising relatively coarse chips. The dimensions of the OSB plate were approximately 30 mm×30 mm. The laminate, obtained by the pressing, whose cork fraction/water glass layer had thickness of approximately 5.5 mm, was then dried at a temperature of approximately 70° C. The OSB plate and the cork fraction/water glass layer applied thereto appeared to adhere well to each other.

Example 14

For a flash-over test, 8 panels were made, i.e.
1) 2×OSB with potato cork/water glass layer with $SiO_2$ (200 g of water glass);
2) 2×OSB with potato cork/water glass layer with $SiO_2$ (400 g of water glass);
3) 2×OSB with potato cork/wood glue layer (polyvinyl acetate);
4) 2×OSB-plate, thickness 18 mm without potato cork layer (reference plate).

These plates were tested according to the flash-over test as described in Dutch standard NEN 6065. Per test, each time, two panels are required. The results of the tests are shown in Table 2.

TABLE 2

Results of the NEN 6065 Flash-over test
Material: sanded OSB plate thickness 18 mm with top layer Tested top layers

| | Weight cork fraction | Binding agent | Admixtures | Supplied energy flow [W] | Flash-over time [min:sec] |
|---|---|---|---|---|---|
| 1 | 500 g | 200 g water glass | 27% SiO2 | 750 | 19:00 |
| 2 | 500 g | 400 g water glass | 27% SiO2 | 1125 | 26:00 |
| 3 | 500 g | 50 g PVAc (water resistant, D3) | 150 g water | 750 | 10:15 |
| 4 | Blank | Sanded OSB | | 750 | 9:00 |

From Table 2 it follows, that the layer of potato cork increases the fire resistance of the OSB plate. It further appears that an increase of the amount of water glass in the layer of potato cork leads to a considerable lengthening of the flash-over time measured.

It is self-evident that the invention is not limited to the examples described. Various modifications are possible within the framework of the invention as set forth by the following claims.

The invention claimed is:

1. A method for manufacturing insulating material, wherein potato steam peels are subjected to a treatment for recovering a cork fraction from those peels, while the insulating material is manufactured from at least the recovered cork fraction and a binding agent, wherein said cork fraction and the binding agent together with another material are compressed to form a construction element, and wherein the binding agent comprises water glass.

2. A method according to claim 1 characterized in that the pressing is carried out at a pressure of at least 10 KN.

3. A method according to claim 1, characterized in that after pressing, said cork fraction is dried.

4. A method according to claim 1, wherein the cork fraction and the binding agent are thermally cured.

5. A method according to claim 1, characterized in that the treatment of the potato peels comprises a step wherein the peels are pressed for the purpose of recovering the cork fraction.

6. A method according to claim 1, characterized in that a starch containing part is pressed from the peels.

7. A method according to claim 1, characterized in that the peels are pressed such that after pressing, the peels contain less than approximately 400 g of starch per 1000 g of dry matter.

8. A method according to claim 7, characterized in that, after pressing, the peels contain less than approximately 300 g of starch per 1000 g of dry matter.

9. A method according to claim 8, characterized in that, after pressing, the peels contain less than 200 g of starch per 1000 g of dry matter.

10. A method according to claim 1, characterized in that the treatment of the potato steam peels comprises a step wherein carbohydrates present in the peels are fermented, at least partially.

11. A method according to claim 1, characterized in that the treatment of the potato steam peels contains a step wherein carbohydrate present in these peels is brought under the influence of an enzyme.

12. A method according to claim 1, characterized in that the potato steam peels during their treatment also undergo a step wherein carbohydrates present in these peels are chemically modified, at least partially.

13. A method according to claim 12, characterized in that said carbohydrates are oxidized, at least partially.

14. A method according to claim 12, characterized in that said carbohydrates undergo an ozone treatment.

15. A method according to claim 12, characterized in that said carbohydrates are hydrophobized, at least partially.

16. A method according to claim 12, characterized in that said carbohydrates are acetylated, at least partially.

17. A method according to claim 12, characterized in that said carbohydrates are cross-linked, at least partially.

18. A construction element comprising:
a layer comprising a cork fraction recovered from potato steam peels and a binding agent compressed to form an insulation material; and
a layer comprising a material selected from the group consisting of wood, plastic, metal, alloy, or combinations thereof,
wherein the cork fraction is provided with a binding agent and said binding agent comprises water glass.

19. A construction element according to claim 18, characterized in that said insulating material extends over at least one side of the element.

20. A construction element according to claim 18, wherein the material is wood.

21. A construction element according to claim 18, wherein the material is a plastic.

22. A construction element according to claim 18, wherein the material is a metal.

23. A construction element according to claim 18, wherein the material is an alloy.

24. A construction element according to claim 18, wherein the insulating material covers a surface of the element completely.

25. A construction element according to claim 18, comprising a sandwich element.

26. A construction element according to claim 18, wherein the element is a panel or a plate.

* * * * *